(12) United States Patent
Yagi

(10) Patent No.: US 7,394,489 B2
(45) Date of Patent: Jul. 1, 2008

(54) COMPARATIVE OBJECT SHOOTING CONDITION JUDGING DEVICE, IMAGE QUALITY ADJUSTMENT DEVICE, AND IMAGE SHOOTING APPARATUS

(75) Inventor: Shigeru Yagi, Minamiashigara (JP)

(73) Assignee: Fuji Xerox Co., Ltd., Tokyo (JP)

(*) Notice: Subject to any disclaimer, the term of this patent is extended or adjusted under 35 U.S.C. 154(b) by 750 days.

(21) Appl. No.: 10/803,911

(22) Filed: Mar. 19, 2004

(65) Prior Publication Data

US 2004/0189820 A1      Sep. 30, 2004

(30) Foreign Application Priority Data

Mar. 24, 2003     (JP)     ............... 2003-079271

(51) Int. Cl.
*H04N 9/73* (2006.01)
(52) U.S. Cl. .................... 348/227.1; 348/362
(58) Field of Classification Search ............. 348/148, 348/362, 227.1
See application file for complete search history.

(56) References Cited

U.S. PATENT DOCUMENTS

| | | | | |
|---|---|---|---|---|
| 2,987,959 A | * | 6/1961 | Kimmel | 359/281 |
| 5,173,748 A | * | 12/1992 | Bilhorn | 356/328 |
| 6,856,354 B1 | * | 2/2005 | Ohsawa | 348/370 |
| 7,230,642 B2 | * | 6/2007 | Iida et al. | 348/222.1 |
| 2001/0048081 A1 | * | 12/2001 | Yagi | 250/372 |
| 2003/0103141 A1 | * | 6/2003 | Bechtel et al. | 348/148 |

FOREIGN PATENT DOCUMENTS

| | | |
|---|---|---|
| DE | 198 33 742 A1 | 2/1999 |
| JP | A 11-46367 | 2/1999 |
| JP | A 2002-71458 | 3/2002 |
| JP | A 2004-38063 | 2/2004 |

* cited by examiner

*Primary Examiner*—David Ometz
*Assistant Examiner*—Usman Khan
(74) *Attorney, Agent, or Firm*—Oliff & Berridge, PLC

(57) ABSTRACT

An object shooting condition judging device for an image shooting apparatus of the present invention includes: an ultraviolet light detecting element for detecting received ultraviolet light; comparing means for comparing ultraviolet light intensity detected by the ultraviolet light detecting element with predetermined intensity that has been determined in advance; and judging means for judging shooting conditions of an object based on the comparison result of the comparing means. This object shooting condition judging device enables quick response and is capable of adjusting white balance of images between indoors and outdoors in a simple and easy manner.

6 Claims, 5 Drawing Sheets

COMPARATIVE OBJECT SHOOTING CONDITION JUDGING DEVICE, IMAGE QUALITY ADJUSTMENT DEVICE, AND IMAGE SHOOTING APPARATUS

CROSS-REFERENCE TO RELATED APPLICATION

This application claims priority under 35 USC 119 from Japanese Patent Application No. 2003-79271, the disclosures of which are incorporated by reference herein.

BACKGROUND OF THE INVENTION

1. Field of the Invention

The present invention relates to an object shooting condition judging device, an image quality adjustment device, and an image shooting apparatus, and specifically, to an object shooting condition judging device for judging object shooting conditions such as light source types by an ultraviolet light receiving element (i.e., an ultraviolet light detecting element) as an external sensor and an image quality adjustment device for adjusting image quality based on the judged object shooting condition in an image shooting apparatus such as a digital camera and video camera, and an image shooting apparatus including the object shooting condition judging device and the image quality adjustment device.

2. Description of a Related Art

Recently, a digital camera and a portable phone equipped with a digital camera are becoming remarkably widespread. These digital cameras, differently from a silver halide film camera, often shoot an object as a subject of shooting while referring to the image of the object in real time by a liquid crystal display device, and the shot image is viewed on the scene.

Further, since the equipment is made compact and lightweight, it is desired that the processing of white balance adjustment according to the difference in light source types in the shooting location is simplified as much as possible.

Generally, in a digital camera and video camera, white balance is adjusted by auto white balance. As the auto white balance, there are the external sensor system and the image detection type. The external sensor system analyzes the color of ambient light cast on the camera, as values, by a color measuring sensor and calculates white balance gain based on the measured color values, thereby adjusting white balance.

On the other hand, the image detection type calculates white balance gain by estimating illumination light source color from the output of the imaging device, and uses RGB signals obtained from the output of the imaging device as criteria.

As the external sensor system, conventionally, a system of measuring light on the scene in four wavebands including ultraviolet light, judging the light source by comparing the ultraviolet light intensity with the light intensity of other three wavebands, and using the result as white balance compensation data has been proposed (Japanese Patent Application Laid-Open (JP-A) No. 2002-71458).

However, in the conventional technology, since the ultraviolet light intensity and the light intensity of other three wavebands are compared, the technology is complicated and quick response can not be obtained. Further, in the case where the ambient illumination light of the camera and the illumination light of the object are different, when shooting outdoors from indoors and the like is attempted, there arises a problem in that white balance can not be adjusted because some of ultraviolet light is absorbed by windowpanes.

SUMMARY OF THE INVENTION

The present invention has been made in view of the above circumstances and provides an object shooting condition judging device which enables quick response and is capable of judging, in a quick-and-easy manner, object shooting conditions that effect on white balance of images indoors and outdoors, an image quality adjustment device capable of adjusting image quality in a quick-and-easy manner, and an image shooting apparatus including the object shooting condition judging device and the image quality adjustment device.

The present inventor has achieved the invention on the basis of discoveries that: ultraviolet light intensity of sunlight and ultraviolet light intensity of an indoor artificial light source are significantly different regardless of cloudy or rainy weather; and shooting conditions of the object can be judged by comparing the ultraviolet light intensity with predetermined intensity that has been determined in advance and judging the type of light source which is illuminating the object based on the comparison result.

For example, in the case where the ultraviolet light intensity is equal to or more than the predetermined intensity, it can be judged that the light source type which is illuminating the object is sunlight, and that the object illuminated by sunlight is to be shot by the shooting apparatus illuminated by sunlight. In the case where the ultraviolet light intensity is less than the predetermined intensity, it can be judged that the light source type which is illuminating the object is an artificial light source such as an indoor fluorescent lamp, and that the object illuminated by artificial light is to be shot by the shooting apparatus illuminated by artificial light.

Based on the above described discoveries, a first aspect of the invention provides an object shooting condition judging device including: an ultraviolet light detecting element for detecting received ultraviolet light; comparing means for comparing ultraviolet light intensity detected by the ultraviolet light detecting element with predetermined intensity that has been determined in advance; and judging means for judging shooting conditions of an object based on the comparison result of the comparing means.

The ultraviolet light detecting element can be disposed either on a taking lens side of the image shooting apparatus or on a side opposite to the taking lens side of the image shooting apparatus. In the image shooting apparatus such as a digital camera, since the object is visualized by a display unit disposed on the opposite side of the taking lens, the ultraviolet light detecting element is preferably disposed on the opposite side of the taking lens.

Further, plural number of ultraviolet light detecting elements can be disposed. That is, a second aspect of the invention provides an object shooting condition judging device including: a first ultraviolet light detecting element disposed on a taking lens side of an image shooting apparatus so as to detect received ultraviolet light; a second ultraviolet light detecting element disposed on a side opposite to the taking lens side of the image shooting apparatus so as to detect received ultraviolet light; comparing means for comparing ultraviolet light intensity detected by the first ultraviolet light detecting element and ultraviolet light intensity detected by the second ultraviolet light detecting element, with a first predetermined value that has been determined in advance, respectively, and also comparing a difference or ratio between the ultraviolet light intensity detected by the first ultraviolet light detecting element and the ultraviolet light intensity detected by the second ultraviolet light detecting element, with a second predetermined value that has been determined in advance; and judging means for judging shooting conditions of an object based on the comparison result of the comparing means.

According to the present aspect, the respective ultraviolet light intensity values detected by plural number of ultraviolet light detecting elements are compared with the first predetermined value. In addition, the difference or ratio between the ultraviolet light intensity values is compared with the second predetermined value. Thereby, shooting conditions of the object such that the object illuminated by outdoor sunlight is shot outdoors in the backlight state, the object illuminated by outdoor sunlight is shot outdoors in the front-light state, the object illuminated by light in the slightly overcast state is shot in the slightly overcast state, the object illuminated by outdoor sunlight is shot from indoors, or the object illuminated by indoor artificial light is shot indoors can be judged.

An ultraviolet light transmitting lens is disposed on an ultraviolet light incident side of the ultraviolet light detecting element, and thereby, ultraviolet light can be condensed and detected. The ultraviolet light detecting element can be constituted by a semiconductor including at least one type of III group element and nitrogen.

A third aspect of the invention is to provide an image quality adjustment device which performs image quality adjustment such as particular brightness and saturation based on the judgment result of the object shooting condition judging device according to the above described aspects.

The image quality adjustment here includes white balance adjustment for adjusting white balance by obtaining white balance gain. This white balance gain may be obtained by computation, or may be determined in advance according to the object shooting conditions.

A fourth aspect of the invention is to provide an image shooting apparatus which is equipped with the object shooting condition judging device and the image quality adjustment device according to the above described aspects.

In the image shooting apparatus of the present aspect, lighting means for lighting flash when shooting based on the comparison result of the comparing means may be further provided. By the lighting means, shooting images can be compensated.

Further, in the image shooting apparatus of the present aspect, plural number of illuminance detecting means for detecting illuminance of visible light may be provided, for example, on both sides of the taking lens side and the opposite side of the taking lens. Lighting means for lighting flash when shooting based on the comparison result of illuminance detected by the illuminance detecting means may be provided.

In addition, images shot with lighting flash may be subjected to image quality adjustment based on the judgment result of any one of the above described object shooting condition judging devices. Furthermore, ultraviolet light intensity detected by the ultraviolet light receiving element may be displayed on a display unit etc.

DETAILED DESCRIPTION OF THE INVENTION

Figure 1:
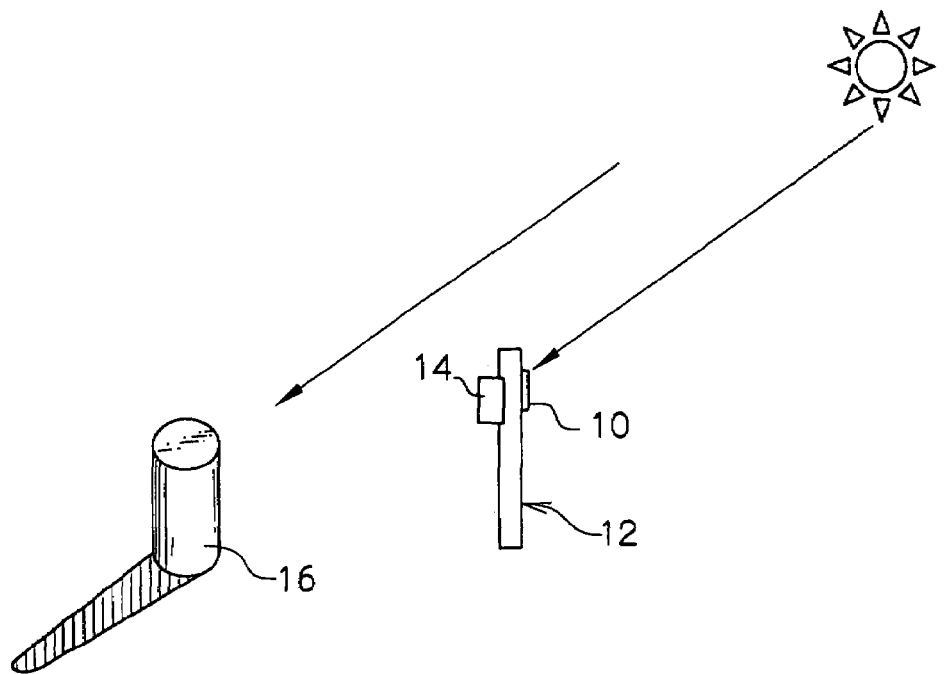
FIG. 1 is a schematic diagram showing a camera of a first embodiment of the present invention.

Hereinafter, the present invention will be described in detail according a first embodiment and a second embodiment by referring to the drawings.

Sunlight is continuous light which is different from artificial light sources that are commonly used in daily life, and includes a large amount of ultraviolet light having wavelength of 290 nm to 400 nm. The light having wavelength of 290 nm to 320 nm is referred to as UVB and the light having wavelength of 320 nm to 400 nm is referred to as UVA. Normally, UVB is 3 to 5% of the entire UVA.

UVB is cut by the normal windowpane, but UVA is transmitted through it and enters indoors. Further, even in cloudy or rainy conditions, ultraviolet light can still be measured as equal to or more than 100 $\mu W/cm^2$ during day time throughout which the sun appears. In contrast, indoors in which sunlight does not stream, a fluorescent lamp is the strongest as an ultraviolet light source, and ultraviolet light of 310 nm, 365 nm, 405 nm, and 430 nm and short-wavelength light are emitted from the fluorescent lamp.

However, even indoors of normal brightness of about 900 lux, the amount of ultraviolet light there is on the order of several $\mu W/cm^2$, and, even at the distance of about 10 cm from a fluorescent lamp, the amount thereof is several tens $\mu W/cm^2$. Further, in a case of a light source such as a halogen lamp, ultraviolet light intensity is less than that of a fluorescent lamp.

In addition, regarding of outdoor sunlight, the ultraviolet light intensity is larger than indoors even in the shade because of reflection of the ground etc.

Therefore, by setting the threshold value of ultraviolet light intensity in advance (for example, by setting the threshold value to equal to or more than 10 $\mu W/cm^2$) and judging that the shooting conditions of the object are outdoors if the detected ultraviolet light intensity is equal to or more than the threshold value and that the shooting conditions of the object are indoors if the detected ultraviolet light intensity is less than the threshold value, the shooting location, i.e., whether outdoors or indoors, can be easily distinguished. That is, the shooting conditions of the object can be easily distinguished.

Even indoors, light which illuminates the object at a sunny place at a window where light streams is substantially sunlight, and UVA is transmitted through the windowpane. Therefore, in the case where indoor ultraviolet light intensity is equal to or more than the threshold value, it is judged as conditions in which the object illuminated by sunlight is to be shot.

Further, in the present embodiment, the illumination light which is illuminating the object is determined by measuring the ambient reflected ultraviolet light in the vicinity of the object through a beam-condensing system (ultraviolet light transmitting lens) capable of transmitting at least long-wavelength ultraviolet light such as UVA. Due to this, in the case of shooting outdoors through a windowpane from indoors, it can reliably be judged that the light illuminating the outdoor object is sunlight.

Then, white balance is adjusted based on the judged light source type that illuminates the object, that is, the shooting conditions of the object.

In order to measure the ambient illumination conditions, only one ultraviolet light receiving element may suffice. The light receiving element may include a lens optical system. Alternatively, the light receiving element may have controlled directionality. Further, these ultraviolet light receiving elements having different characteristics may be combined. An object shooting condition judging device equipped with plural different ultraviolet light receiving elements each having different lenses and directionality is suitable for the case where ambient light and the light illuminating the subject to be measured are different.

As the ultraviolet light receiving element used for the present embodiment, an ultraviolet light receiving element as a compound semiconductor made of nitrogen and at least one type of element selected from the group consisting of Al, Ga and In is preferable because ultraviolet light can be measured without using a filter. Or, the ultraviolet light receiving element may be the above described compound semiconductor including hydrogen. Alternatively, the ultraviolet light receiving element may be an element using an oxide semiconductor such as titanium oxide and zinc oxide, or a photodiode using gallium phosphide and Si provided with an ultraviolet light transmitting filter.

The ultraviolet light receiving element can be disposed juxtaposed to the lens of the camera, or, on the opposite side of the lens of the camera. Alternatively, the ultraviolet light receiving elements can be disposed on both sides of the lens of the camera.

First Embodiment

FIG. 1 shows the first embodiment in which an ultraviolet light receiving element is disposed on the opposite side of the lens of a digital camera. In an ultraviolet light receiving element 10 for receiving and detecting ultraviolet light including UVA, an ultraviolet light transmittable and UV condensing lens for condensing the ultraviolet light including UVA onto the light receiving surface may be provided.

This ultraviolet light receiving element 10 is disposed on a surface of a digital camera 12, which surface is opposite to the surface of the camera on which a taking lens 14 is provided. In the digital camera 12, a microcomputer for judging the shooting conditions of an object by a program for judging the shooting conditions of an object and a white balance adjustment device for adjusting white balance based on the set white balance adjustment are provided.

Figure 6:
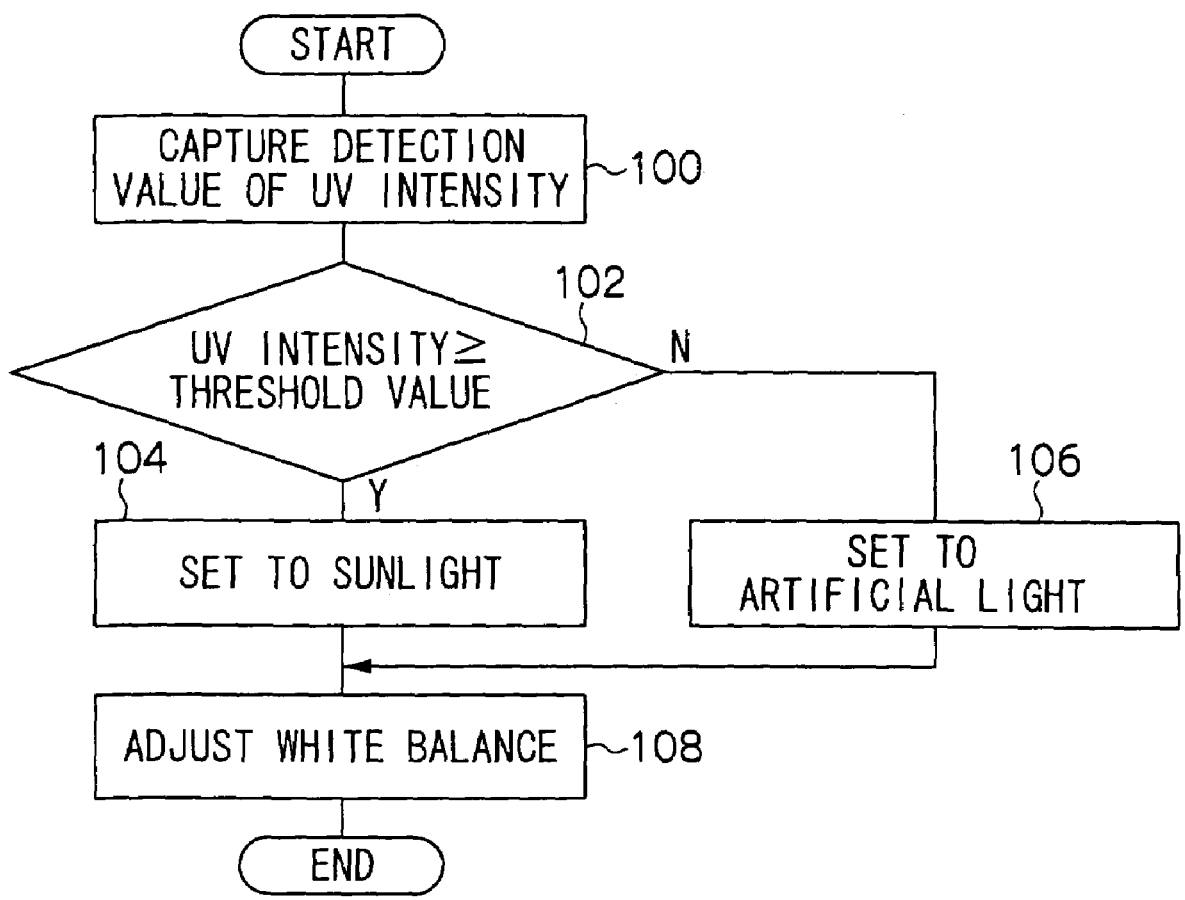
FIG. 6 is a flowchart showing a processing routine for adjusting white balance of the first embodiment of the invention.

In the present embodiment, by the microcomputer mounted on the digital camera 12, ultraviolet light intensity detected by the ultraviolet light receiving element 10 is captured according to the processing routine shown in FIG. 6 (Step 100), and the ultraviolet light intensity is compared to the preset threshold value (Step 102). If the detected ultraviolet light intensity is equal to or more than the threshold value, the illumination light of the object is judged as sunlight and white balance adjustment for sunlight is set (Step 104). If the detected ultraviolet light intensity is less than the threshold value, the illumination light of the object is judged as artificial light and white balance adjustment for artificial light is set (Step 106). Then, white balance is adjusted based on the white balance adjustment set according to the object shooting conditions (Step 108).

In the digital camera, normally, a system in which an image of the object is confirmed (seen) through a display unit such as an LCD is generally adopted. Accordingly, in order to judge the illumination conditions of the object, it is preferred that the ultraviolet light receiving element is disposed on the opposite side of the lens of the digital camera.

As shown in FIG. 1, in the case where the object 16 illuminated by sunlight is shot in the front-light state, the intensity of the ultraviolet light cast at the UV light receiving element in the same direction as the light beam illuminating the object is measured and the measured ultraviolet light intensity is compared with the threshold value, whereby the type of the light source (object shooting condition) is judged. That is, if the ultraviolet light intensity is equal to or more than the threshold value, it can be judged that the object 16 is illuminated by sunlight.

If judged as sunlight, white balance adjustment is set for sunlight and white balance is adjusted accordingly. At this time, the detected ultraviolet light intensity may be displayed on a display.

Figure 2:
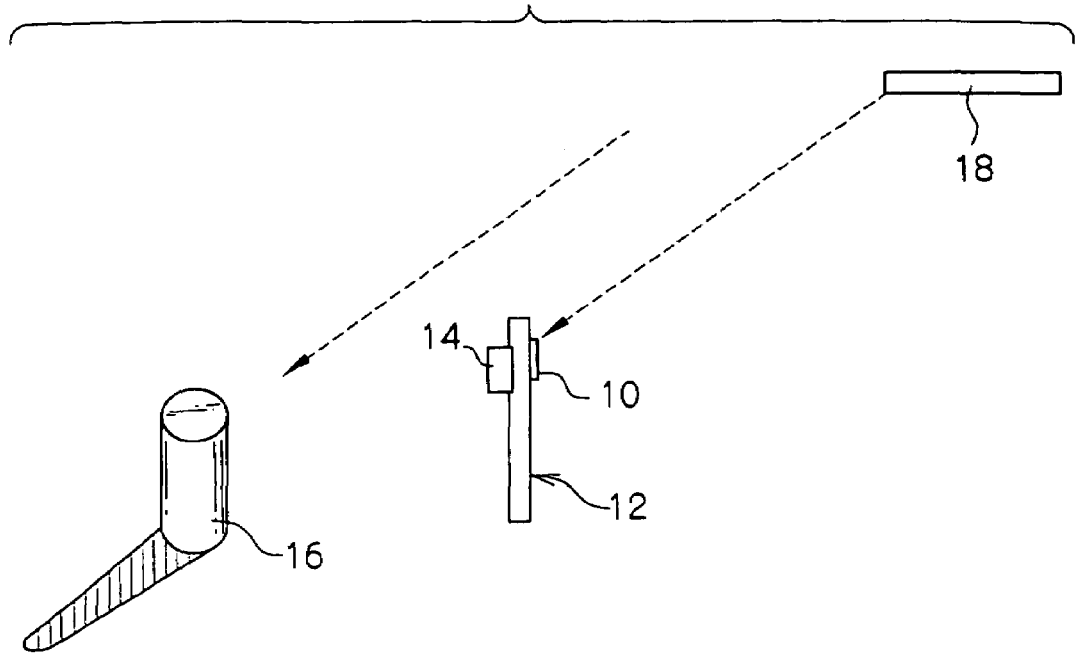
FIG. 2 is another schematic diagram showing the camera of the first embodiment of the invention.

FIG. 2 shows the indoor shooting condition in the present embodiment. In the case where the object illuminated by the light of a fluorescent lamp is shot in the front-light state, since the detected ultraviolet light intensity is less than the threshold value, white balance adjustment is set for an artificial light source and white balance is adjusted accordingly.

Even in the case where the sun is on the back of the object, that is, when the object illuminated by sunlight is shot in the backlight state, the ultraviolet light receiving element 10 disposed on a surface of the digital camera, which surface is opposite to the surface on which the lens is provided, is irradiated with the scattered ultraviolet light of the sun. Therefore, the ultraviolet light intensity becomes equal to or more than the threshold value and thus the outdoor shooting, i.e., a fact that the illumination light of the object is sunlight can be confirmed.

Further, in the case where the sun is on the back of the object, i.e., where the object illuminated is shot in the backlight state, in addition to the judgment on whether outdoor shooting or indoor shooting, whether the sun is on the back of the object or not may be judged. If the sun is on the back of the object, the problem of degradation of shot image quality can be solved by lighting flash.

Second Embodiment

Figure 3:
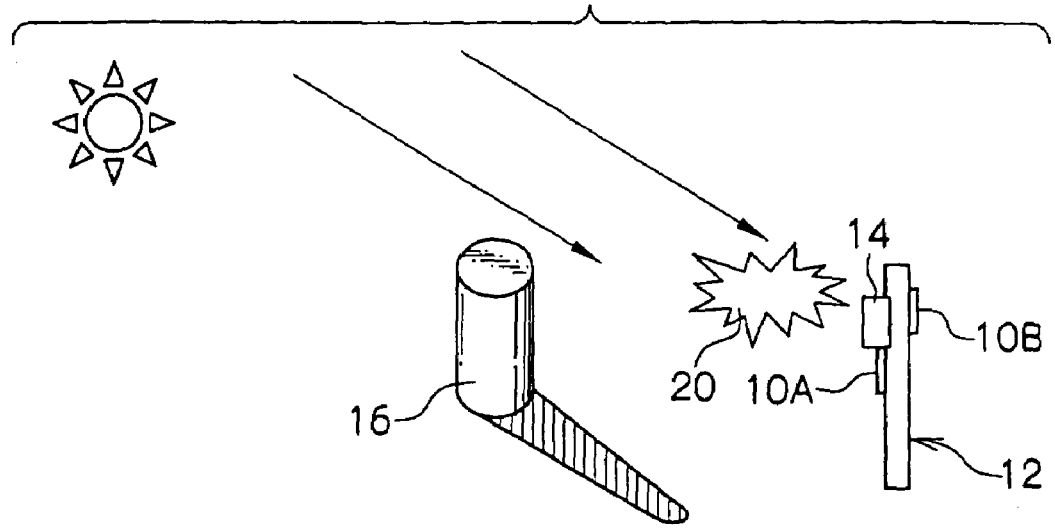
FIG. 3 is a schematic diagram showing the condition in which an object is shot outdoors in the backlight state using a camera of a second embodiment of the invention.

In the second embodiment, as shown in FIG. 3, ultraviolet light receiving elements 10A and 10B are disposed on both sides, i.e., on the lens side surface and the side opposite to the lens side surface of the camera, outputs of the two ultraviolet light receiving elements are compared, and whether the camera is facing the sun or not, that is, whether the sun is on the back of the object or not is judged. Note that the ultraviolet light receiving elements 10A and 10B each have the same constitution as the above described ultraviolet light receiving element 10.

Further, by setting in advance a threshold value (set value B) of the output difference (or output ratio), it can be determined whether or not the shooting condition is the complete backlight state or whether or not the shooting condition is a state in which, although the sun is on the back, it is slightly overcast and there is relatively little effect by light on the brightness of the background and that of the object.

In the case of complete backlight state etc., image compensation can be performed by lighting a flash 20 or the like automatically. At this time, the value B can be set such that, when the signal difference (UV1-UV2) or signal ratio (UV1/UV2) of the output UV1 of the lens side ultraviolet light receiving element 10A to the output UV2 of the ultraviolet light receiving element 10B on the opposite side of the lens is smaller than the value B (the B value may be set, for example, in a range of 2 to 10), it can be judged that the shooting condition is an "incomplete backlight condition", which is substantially a front light state or a state in which, although illumination light of the object is backlight, it is slightly overcast or the sun streams in from the diagonally lateral direction.

In the above-described case, if the output of the ultraviolet light receiving element 10B on the opposite side of the lens is relatively large, it can be judged that the object is irradiated with light in the front-light state.

Even in the case where ultraviolet light is relatively weak as in the morning sun and evening sun, since the amount of ultraviolet light is still larger outdoors than indoors, problems of the distinction between outdoors and indoors, as well as the problem of backlight, can be solved.

Further, in the case where two or more illuminometers for visible light or shooting elements are disposed on both sides, i.e., on the lens side surface and the side opposite to the lens side surface of the camera, in a manner similar to that of disposing the ultraviolet light receiving elements 10A and 10B, in addition to the above described determination on whether outdoors or indoors by the ultraviolet light receiving elements etc., the problem of backlight under the strong illumination of visible light can also be solved by using the respective outputs of the illuminometers, which outputs represent illuminance of visible light that changes in accordance with the position of the object relative to the light source.

In order to solve the problem of backlight by using illuminometers, as is the case with "case 1" of Table 1 shown below in which ultraviolet light receiving elements are used, if each of the outputs of the illuminometers is equal to or more than the first predetermined value, and the ratio of the output of the illuminometer on the lens side to the output of the illuminometer on the opposite side to the lens is equal to or more than the second predetermined value, the condition is judged as the backlight state. In this case, image compensation can be effected by lighting flash.

Further, in a case where the shooter and the object are illuminated separately by different light sources, the shooting conditions of the object can also be correctly judged, as shown in Table 1 shown below.

TABLE 1

|  | UV1 | UV2 | UV1/UV2 | Judgment |
|---|---|---|---|---|
| Case 1 | ≧Set value A | ≧Set value A | ≧Set value B | In backlight state outdoors |
| Case 2 | ≧Set value A | ≧Set value A | <Set value B | In normal, slightly overcast state outdoors |
| Case 3 | ≧Set value A | <Set value A |  | Shooting outdoors from indoors |
| Case 4 | <Set value A | <Set value A |  | Indoors |

Figure 7:
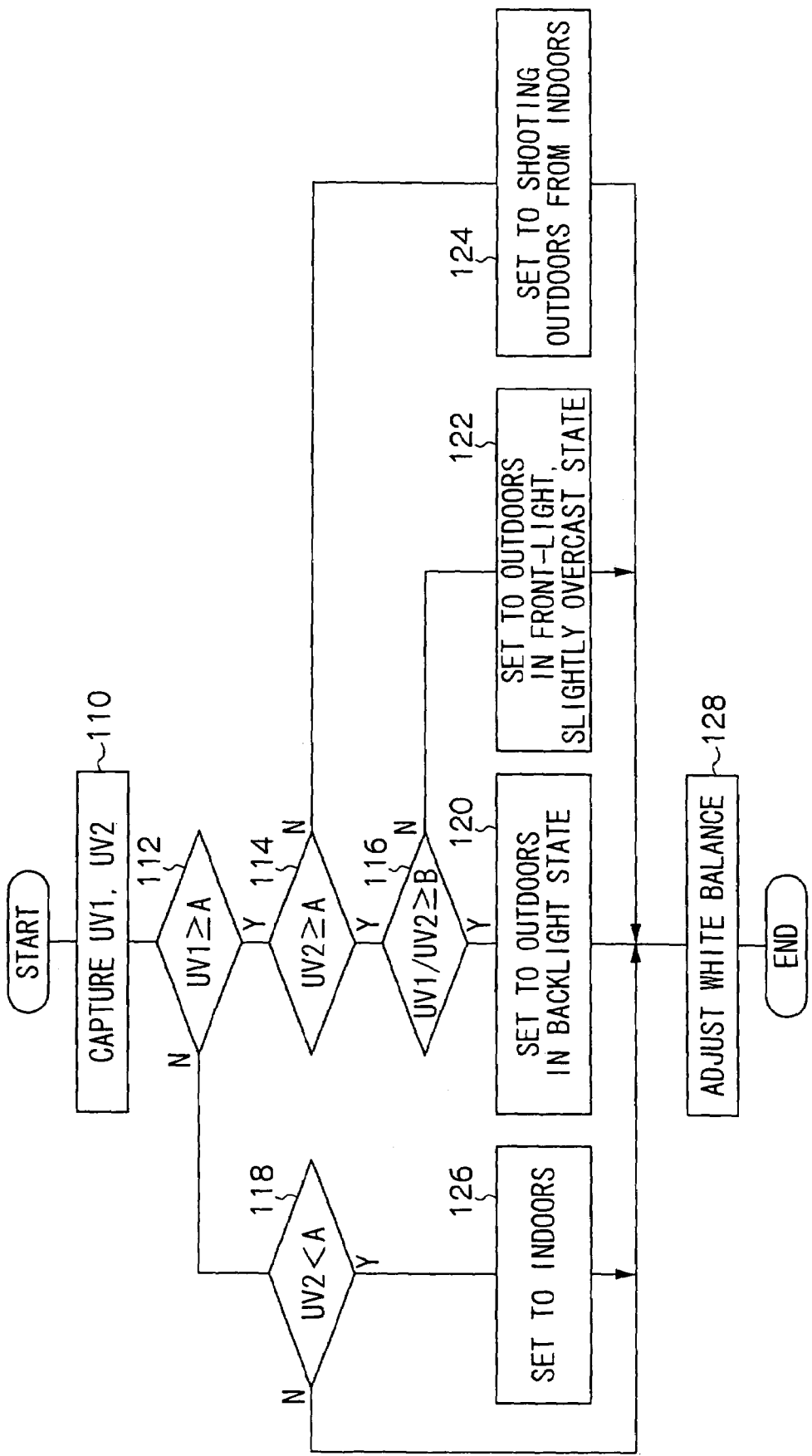
FIG. 7 is a flowchart showing a processing routine for adjusting white balance of the second embodiment of the invention.

The processing routine for adjusting white balance by judging the above object shooting conditions by using the microcomputer mounted to the digital camera 12 is shown in FIG. 7.

First, the output UV1 of the ultraviolet light receiving element 10A and the output UV2 of the ultraviolet light receiving element 10B are captured (Step 110), each of the output UV1 and the output UV2 is compared with the set value A, and the output ratio UV1/UV2 is compared with the set value B (Steps 112 to 118).

Figure 4:
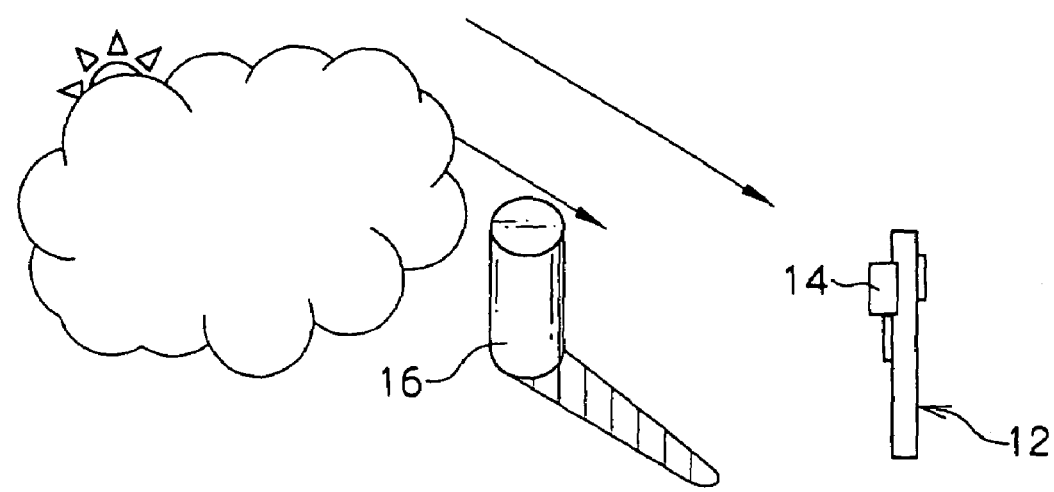
FIG. 4 is a schematic diagram showing the condition in which an object is shot outdoors in the slightly overcast state using the camera of the second embodiment of the invention.
Figure 5:
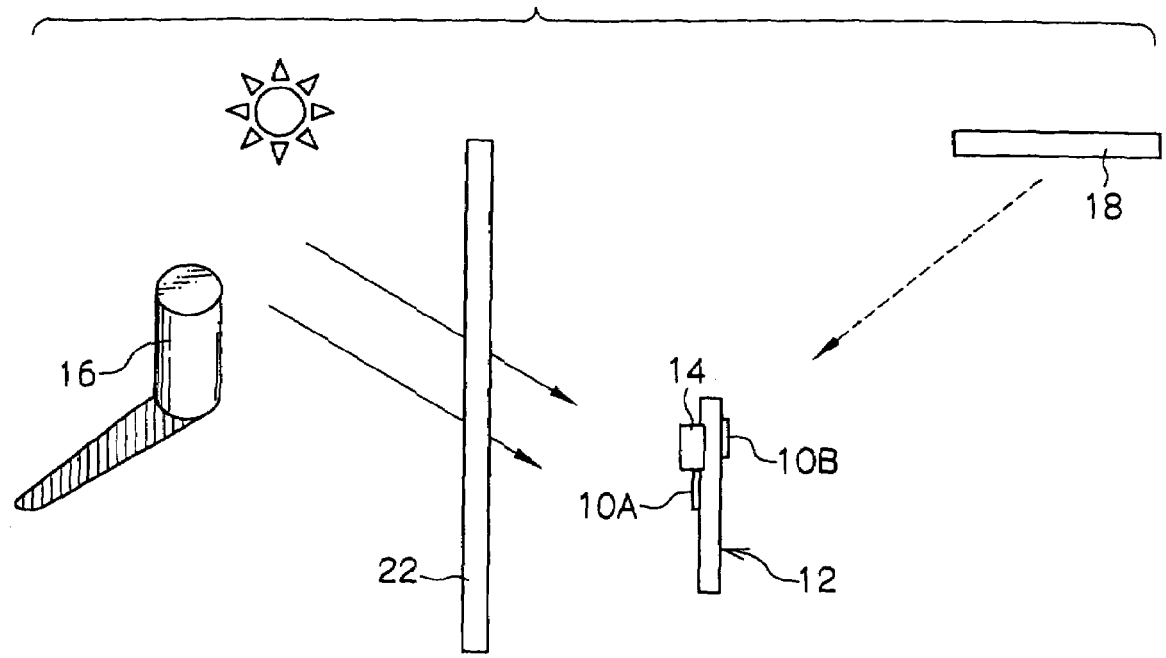
FIG. 5 is a schematic diagram showing the condition in which an outdoor object is shot from indoors through a windowpane using the camera of the second embodiment of the invention.

Case 1 in Table 1 is the case where the outdoor object 16 illuminated by sunlight is shot in the backlight state, as shown in FIG. 3 (case 1 is judged as shown in Table 1, as a result of Steps 112, 114, 116, and 120). Case 2 is the case where the object 16 is shot outdoors in the slightly overcast state, as shown in FIG. 4 (case 2 is judged as shown in Table 1, as a result of Steps 112, 114, 116, and 122). Case 3 is the case where the outdoor object 16 illuminated by sunlight is shot from indoors through a windowpane 22, as shown in FIG. 5 (case 3 is judged as shown in Table 1, as a result of Steps 112, 114, 116, and 124).

Note that, the case where the indoor object is shot toward the outside at a window, as shooting a portrait at the window, is judged as case 1. Further, the case where the object and the shooter are positioned indoors at a window, so as to be in parallel with the window, is judged as case 2. However, in this standing-at-window case, if the object and the shooters are positioned off the window by a certain distance or more, i.e., positioned slightly inner side of the room, the case is judged as case 4 (Step 126). Then, when the object shooting conditions are judged, white balance adjustment according to each of the aforementioned conditions is set (Steps 120 to 126), and white balance is adjusted based on the set white balance adjustment (Step 128). The image quality adjustment may be performed with particular brightness or saturation, in addition to the adjustment of white balance.

Here, the output UV1 is the output of the ultraviolet light receiving element 10A facing the same direction as the taking lens does, while the output UV2 is the output of the ultraviolet light receiving element 10B facing the opposite direction to the taking lens. It is desirable that the set value A is set as ultraviolet light intensity of $10\,\mu W/cm^2$ to $1000\,\mu W/cm^2$. It is desired that the set value B is in a range of 2 to 10.

The ultraviolet light receiving element may have controlled directionality. The directionality of the light receiving element may be effected by a lens or by forming an incident window, as a hole, in the light receiving element such that an optical path extends from the entrance window. As the lens, glass or plastic of a material that at least allows transmission of UVA is used.

As described above, according to the object shooting condition judging device of the present invention, since the device employs ultraviolet light detecting elements, a response of the device can be made quick and object shooting conditions regarding indoors/outdoors, that effect on the image quality such as white balance, can be judged in a quick-and-easy manner. That is, an advantageous effect is obtained.

Further, according to the image adjustment device of the present invention, since the device employs ultraviolet light detecting elements, a response of the device can be made quick and quality of indoor/outdoor images can be adjusted in a simple and easy manner, which is another advantageous effect.

Moreover, according to the image shooting apparatus of the present invention, a response of the apparatus can be made quick and object shooting conditions regarding indoors/outdoors, that effect on the image quality can be determined in a simple and easy manner. Further, according to the image shooting apparatus, a response of the apparatus can be made quick and quality of indoor/outdoor images can be adjusted in a simple and easy manner. Therefore, there is obtained yet other advantageous effect in that good image quality can be obtained not only in a still image shooting apparatus but also in a moving image shooting apparatus.

What is claimed is:

1. An object shooting condition judging device comprising:
   a first ultraviolet light detecting element disposed on a taking lens side of an image shooting apparatus so as to detect received ultraviolet light;
   a second ultraviolet light detecting element disposed on a side opposite to the taking lens side of the image shooting apparatus so as to detect received ultraviolet light;
   comparing means for comparing ultraviolet light intensity detected by the first ultraviolet light detecting element and ultraviolet light intensity detected by the second ultraviolet light detecting element, with a first predetermined value, respectively, and also comparing a difference or ratio between the ultraviolet light intensity detected by the first ultraviolet light detecting element and the ultraviolet light intensity detected by the second ultraviolet light detecting element, with a second predetermined value; and
   judging means for judging shooting conditions of an object based on the comparison result of the comparing means.

2. The object shooting condition judging device according to claim 1, wherein an ultraviolet light transmitting lens is disposed on an ultraviolet light incident side of the ultraviolet light detecting element.

3. The object shooting condition judging device according to claim 1, wherein the ultraviolet light detecting element is constituted by a semiconductor including at least one group III element and nitrogen.

4. The object shooting condition judging device according to claim 1, further comprising a display unit for displaying ultraviolet light intensity detected by the ultraviolet light receiving element.

5. The object shooting condition judging device according to claim 1, wherein the first predetermined value of ultraviolet light is equal to or more than $10\ \mu W/cm^2$.

6. An image adjustment device comprising:
   a first ultraviolet light detecting element disposed on a taking lens side of an image shooting apparatus so as to detect received ultraviolet light;
   a second ultraviolet light detecting element disposed on a side opposite to the taking lens side of the image shooting apparatus so as to detect received ultraviolet light;
   comparing means for comparing ultraviolet light intensity detected by the first ultraviolet light detecting element with a first predetermined value, the comparing means also comparing ultraviolet light intensity detected by the second ultraviolet light detecting element with the first predetermined value, and the comparing means also comparing a difference between the ultraviolet light intensity detected by the first ultraviolet light detecting element and the ultraviolet light intensity detected by the second ultraviolet light detecting element or a ratio between both intensities to a second predetermined value;
   judging means for judging shooting conditions of an object based on the comparison result of the comparing means; and
   adjustment means for adjusting white balance according to the judgment result of the judging means.

* * * * *